(12) United States Patent
Samsoniuk et al.

(10) Patent No.: US 10,958,473 B2
(45) Date of Patent: Mar. 23, 2021

(54) METHOD OF OPERATING A UNIT IN A DAISY CHAIN, COMMUNICATION UNIT AND A SYSTEM INCLUDING A PLURALITY OF COMMUNICATION UNITS

(71) Applicant: Unify Patente GmbH & Co. KG, Munich (DE)

(72) Inventors: Marcelo Samsoniuk, Curitiba (BR); Paulo Henrique Bernardi, Curitiba (BR); Diogo Wachtel Granado, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/476,670

(22) PCT Filed: Jan. 11, 2017

(86) PCT No.: PCT/EP2017/025002
§ 371 (c)(1),
(2) Date: Jul. 9, 2019

(87) PCT Pub. No.: WO2018/130263
PCT Pub. Date: Jul. 19, 2018

(65) Prior Publication Data
US 2019/0342116 A1 Nov. 7, 2019

(51) Int. Cl.
*H04L 12/28* (2006.01)
*H04L 12/42* (2006.01)

(52) U.S. Cl.
CPC .................. *H04L 12/42* (2013.01)

(58) Field of Classification Search
CPC ....................................................... H04L 12/28
(Continued)

(56) References Cited

U.S. PATENT DOCUMENTS 9,432,298 B1 * 8/2016 Smith ................. H04L 49/9057
2011/0128970 A1 6/2011 Breton et al.
(Continued)

FOREIGN PATENT DOCUMENTS

| EP | 2001170 A2 | 12/2008 |
| EP | 2178249 A1 | 4/2010 |
| EP | 2472795 A1 | 7/2012 |

OTHER PUBLICATIONS

International Search Report for PCT/EP2017/025002 dated Mar. 14, 2017.
(Continued)

*Primary Examiner* — Dang T Ton
(74) *Attorney, Agent, or Firm* — Buchanan Ingersoll & Rooney PC

(57) ABSTRACT

When operating a first unit in a daisy chain of units allowing bidirectional communication, each unit is capable to transmit and to receive signals. A plurality of units including the said first unit transmits a respective signal to a preceding neighbor unit preceding in said daisy chain and to a following neighbor unit following in the daisy chain. In the daisy chain, the first unit determines whether or not it receives a signal from both of these neighbor units or not and if so, said first unit operates so as to put the at least one subunit into a first state. If the at least one subunit is not put into a first state, it operates so as to put the at least one subunit into a second state different from said first state.

19 Claims, 4 Drawing Sheets

(58) Field of Classification Search
USPC .......................................................... 370/329
See application file for complete search history.

(56) References Cited

U.S. PATENT DOCUMENTS

2019/0116480 A1* 4/2019 Schultz ................. H04W 24/08
2019/0385057 A1* 12/2019 Litichever ........... H04L 63/1416

OTHER PUBLICATIONS

Written Opinion of the International Searching Authority for PCT/EP2017/025002 dated Mar. 14, 2017.

* cited by examiner

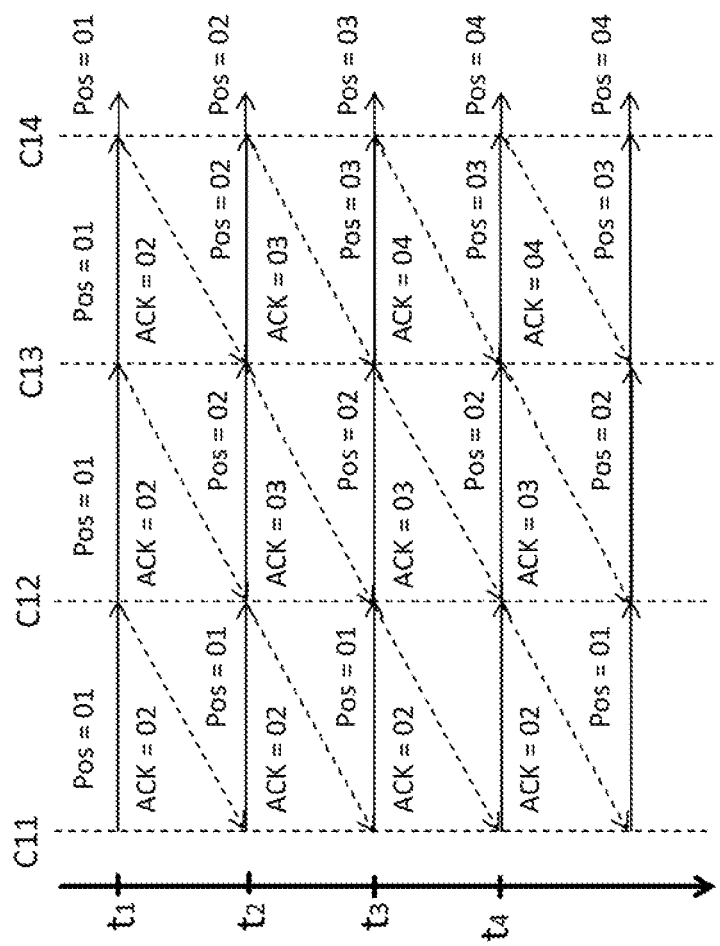

METHOD OF OPERATING A UNIT IN A DAISY CHAIN, COMMUNICATION UNIT AND A SYSTEM INCLUDING A PLURALITY OF COMMUNICATION UNITS

FIELD OF THE INVENTION

The present invention relates to the field of operating individual communication units coupled to each other, namely in a bus system. Specifically, the invention relates to a method of operating a first unit in a daisy chain of units allowing bidirectional communication, and further relates to a communication unit, and to a system including a plurality of such communication units. The invention has specific application to the field of RS-485 multi-drop-busses, as a communication bus.

BACKGROUND OF THE INVENTION

In serial arrangements of communication units, coupled via a bus, a problem one has to commonly deal with is that the first and last communication unit in the series have to provide for a termination for the sake of impedance matching. This is depicted in FIG. 1:

A plurality of communication units C01, C02, C03 and C04 is serially coupled, each having a transceiver-interface for coupling to a following neighbor. Said transceiver-interface is, in FIG. 1 indicated at TCI-R, wherein TCI stands for "transceiver interface", and wherein "R" represents the right hand side in the figure. Each communication unit C01, C02, C03, C04 further is provided with a transceiver interface for coupling to a preceding communication unit, herein depicted as TCI-L (transceiver interface, to the left in the FIG. 1). In the present application, the following neighbor is the neighbor in the series of communication units following, according to the coupling series, in a first direction, whilst the preceding communication unit is the one following in the second coupling direction, wherein the second coupling direction is opposite to the first coupling direction.

The first communication unit C01 needs an impedance termination T, and the last one, C04, needs as well an impedance termination T. Such impedance termination T could be externally provided, but it is preferred that each communication unit itself includes such impedance termination, which might be activated and deactivated by means of a switch, or under control of electrical signals. The problem arising then, however, is that the communication unit would need to identify at which place in the chain it is connected. Namely, communication unit C01 would need to activate the impedance termination T, and communication unit C04 as well, whereas communication units C02 and C03 would not have to do so.

In the field, mechanical solutions are known for activating a terminal switch, see for instance U.S. Pat. Nos. 5,706,447 A, 6,058,444 A and 5,882,228 A. Switching due to switch signals is known from U.S. Pat. Nos. 7,068,064 B1, 6,411,122 B1, 6,888,370 B1, and 5,939,997. Well-known is the SIEMENS PROFIBUS TERMINATOR for providing a terminal impedance, see for instance the link available on 12 Dec. 2016: https://cache.industry.siemens.com/dl/files/444/19102444/att_111899/v1/3B_812_6727-10a_Terminator.pdf.

In the field of communication in daisy chains, generally, it is known that a communication device might change the communication path over which data are sent dependent on a received address and how that matches to a stored address, see US 2003/0126333 A1. U.S. Pat. No. 5,210,530 A discloses the use of a poll address in a daisy chain for communicating. U.S. Pat. No. 5,715,475 A teaches a master device to determine the position of each of the slave devices based on responses to a signal. These latter documents do not deal with switching for activating and deactivating of terminal impedances.

SUMMARY OF THE INVENTION

It is an object of the invention to improve the settings of the individual communication units in a serial (bus) chain, namely with the purpose to define the terminal impedance, or other properties in the serial chain dependent on the absolute position or at least a relative position of the communication units in the chain.

The method is solved in a first aspect by a method of operating a first unit in a daisy chain of units allowing bidirectional communication, each unit capable to transmit and to receive signals, wherein a plurality of units including said first unit transmits a respective signal (via an interface able for coupling) to a preceding neighbor unit preceding in said daisy chain and (via an interface able for coupling) to a following neighbor unit following in said daisy chain, wherein said first unit determines whether or not it receives a signal from both of such neighbor units or not and if so, said first unit operates so as to put (or to place) said at least one subunit into a first state, and if not, operates so as to put (or to place) said at least one subunit into a second state different from said first state.

In a preferred embodiment of the method, one of the signals to the neighbor units is a request signal and the other signal to the neighbor units is a receipt signal sent only if a request signal from another unit is received.

In a further preferred embodiment of the method, a respective counter is initially set by processing means in each of the units to a starting value, and the starting value is then increased or decreased in a predetermined manner dependent on whether or not data are received from a preceding unit or a following unit in the daisy chain. The predetermined manner can, for instance, include that the counter is more and more increased, each time preferably by one, starting from 1, until an equilibrium situation is achieved. In the equilibrium situation, the counter will then provide information about the position of the individual unit where the counter is set, in the daisy chain.

In a second aspect of the invention, a communication unit is provided which includes a first transmitting interface and a first receiving interface for connecting said communication unit with a first other communication unit, and which further includes a second transmitting interface and a second receiving interface for connecting said communication unit with a second other communication unit. The communication unit itself includes at least one subunit to which at least two states are defined, wherein the communication unit includes transmitting and receiving means for transmitting signals via both of its transmitting interfaces and for receiving signals via both of its receiving interfaces, and further includes processing means configured to transmit or cause transmitting of signals via both transmitting interfaces and to change the state of the first subunit if no signal is received via said first receiving interface and/or to change the state at least one second subunit if no signal is received via said second receiving interface. The processing means can also be configured to change the state of the at least one first subunit of the communication unit if a signal is received via said first receiving interface and/or to change the state of the at least one first or at least one second subunit if a signal is received via said receiving interface. The actual embodiment depends on which state is initially defined, of course. Hence, in any case, the processing means is configured to define the individual states in dependence on whether or not a signal is received via said first receiving interface and/or via said second receiving interface.

In some embodiments, the processing means can include a processor connected to a non-transitory computer readable medium. Code can be stored in the non-transitory computer readable medium that is executable by the processor of the processing means to configure the communication unit to perform at least one function.

In a preferred embodiment of the inventive communication unit, the subunit includes a switch for connecting or not of a terminal impedance to the daisy chain. There might be a single subunit including a respective switch for suitable connection dependent on whether the signal is not received via the first receiving interface on the one hand and if no signal is received via the second receiving interface. On the other hand, however, there might be two different subunits, a first subunit which includes a switch for connecting of a first terminal impedance to the daisy chain if no signal is received via said first receiving interface, and a second subunit which includes a switch for connecting of the first or a second terminal impedance to the daisy chain if no signal is received via the second receiving interface.

Alternatively, the first subunit acts to define the communication unit as a master in a daisy chain, in a first state, and as a slave in such daisy chain, in a second state.

In a third aspect of the invention, a (bus) system is provided which includes a plurality of communication units of the inventive type, in a daisy chain arrangement obtained by coupling the first transmitting interface of a first communication unit to the second receiving interface of a second communication unit and by coupling the first receiving interface of the first communication unit to the second transmitting interface of the second communication unit.

In some embodiments, the communication bus of the system can be coupled to each of the communication units in a well-known manner and is thus coupling these to each other as well.

Preferably, the system includes a RS-485 multi-drop-bus as a communication bus, coupled to each of the communication units and coupling same to each other as well.

Embodiments of the invention can provide the idea of a bidirectional communication in a daisy chain for the purpose of identifying the individual position of the communication units. If a communication unit receives no signal at the receiving interface where a preceding communication unit could be coupled, it is most likely that the communication unit is the first in the daisy chain. If the communication unit receives both at its first receiving interface and its second receiving interface signals from other communication units, it is an intermediate communication unit. Still further, the last communication unit does not receive any signals via the receiving interface where a following communication unit would usually be coupled. That, in turn, allows each individual communication unit to determine itself, by its processing unit, where it is positioned, without being under control of a master. For instance, the first and last communication units can activate the switch such as to couple the terminal impedance to the daisy chain, wherein the second to the one before the last communication unit deactivate the terminal impedance. The first communication unit can as well be defined to act as a master, and the remaining communication units as slaves. Hence, the capability of bidirectional communication can allow for a specific scheme especially in the initial communication when the daisy chain system is first started at all, or first started after some interruption. Such interruption might be identified when the power has been turned off for a predetermined minimum while (or time interval), or is identified when the power has remained on but no signals have been sent for a predetermined minimum while (or time interval).

BRIEF DESCRIPTION OF THE DRAWINGS

The present invention will be better understood with respect to the following description of a preferred embodiment and with respect to the drawings, in which:

FIG. 4 is a time diagram depicting the signal flow in such daisy chain bus arrangement.

DETAILED DESCRIPTION OF EXEMPLARY EMBODIMENTS

Figure 1:
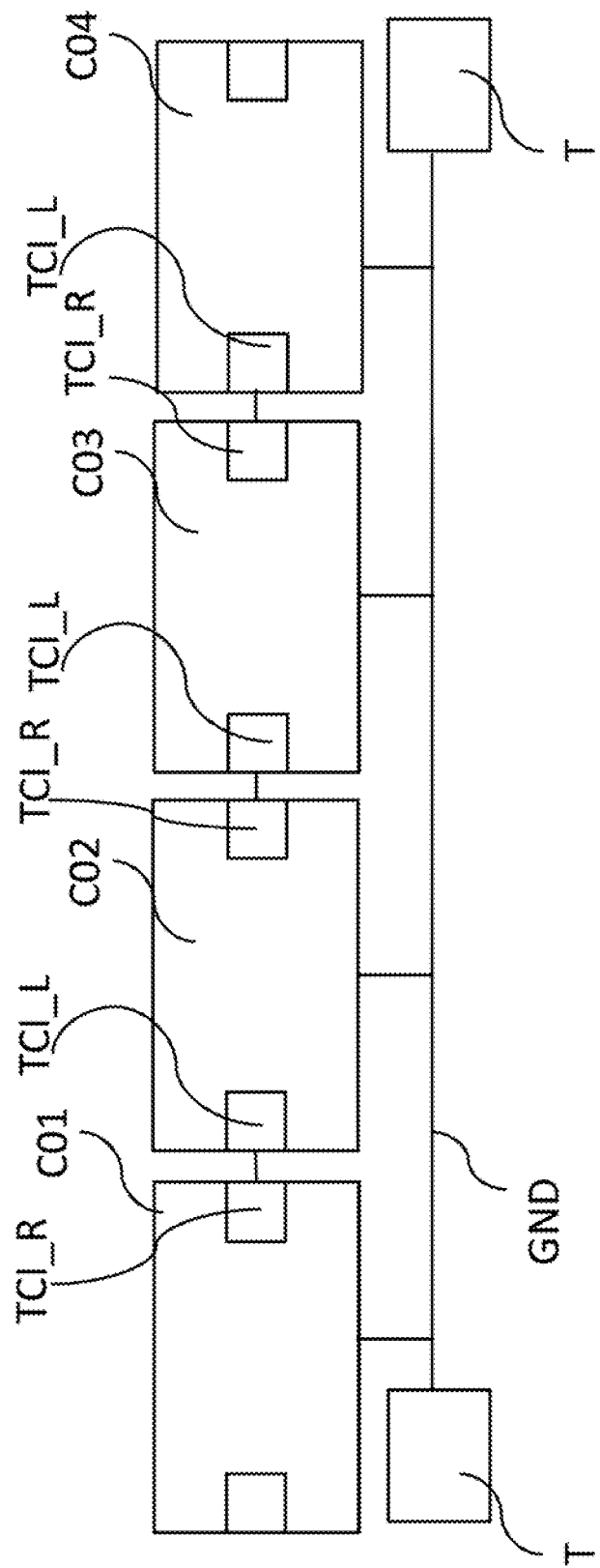
FIG. 1 shows a serial bus arrangement of communication units according to the prior art.
Figure 2:
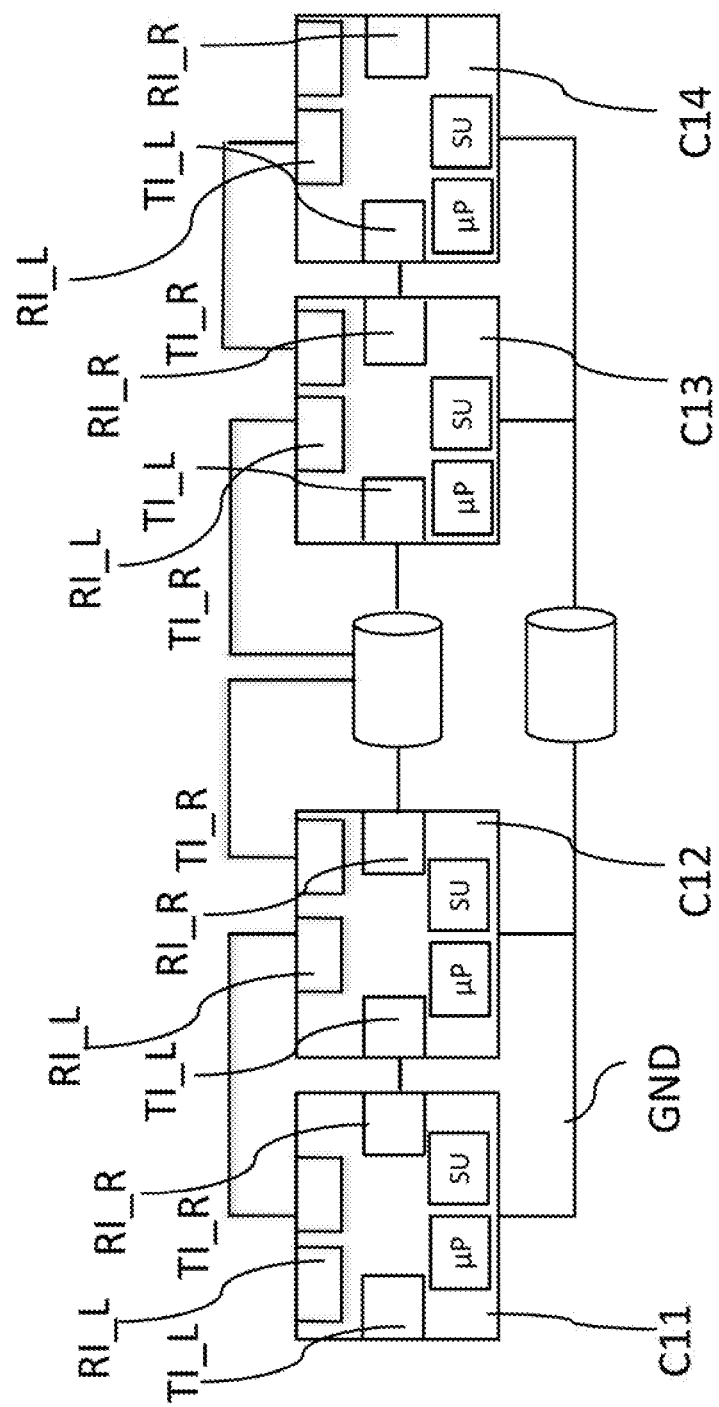
FIG. 2 shows a daisy chain bus arrangement of communication units according to an exemplary embodiment of the invention.

The communication units of FIG. 2 as identified by C11, C12, C13 and C14, represent an entire daisy chain which might be composed of further or less communication units, and coupled by a bus (preferably an RS-485 bus) as indicated by lines between the communication units.

Each communication unit C11, C12, C13 and C14 is provided with two interfaces via which transmission of signals to another communication unit takes place, namely is provided with transmission interface TI-L (as depicted to the left hand side), and transmission interface TI-R (as depicted to the right hand side).

Each communication unit C11, C12, C13 and C14 further includes a receiving interface, RI-L to the left as connected to the transmission interface TI-R of the preceding communication device (if any), and a further receiving interface RI-R to the right as connected to the transmission interface TI-L of the following communication device (if any). Hence, we are having a duplex interface TI-L, RI-L to connect with RI-R and TI-R, i.e., another duplex interface of the preceding communication unit, and we have a further duplex interface TI-R, RI-R to couple with a duplex interface RI-L, TI-L of the following communication unit. Such coupling can take place via a dedicated cable, having in the case of an RS-485 multi-drop-bus only one wire (for providing for an additional signal-path).

Each communication unit C11, C12, C13 and C14 includes a subunit SU as controlled by microprocessor μP, and wherein said subunit SU can be put, by the processing unit μP, into two different states. The microprocessor of the processing unit μP acts herein both as a transmitting and receiving means and as a processing means. The microprocessor can be connected to a non-transitory computer readable medium that has code stored thereon that is executable by the microprocessor so that the processing means facilitates performance of at least one function defined by the code.

Figure 3:
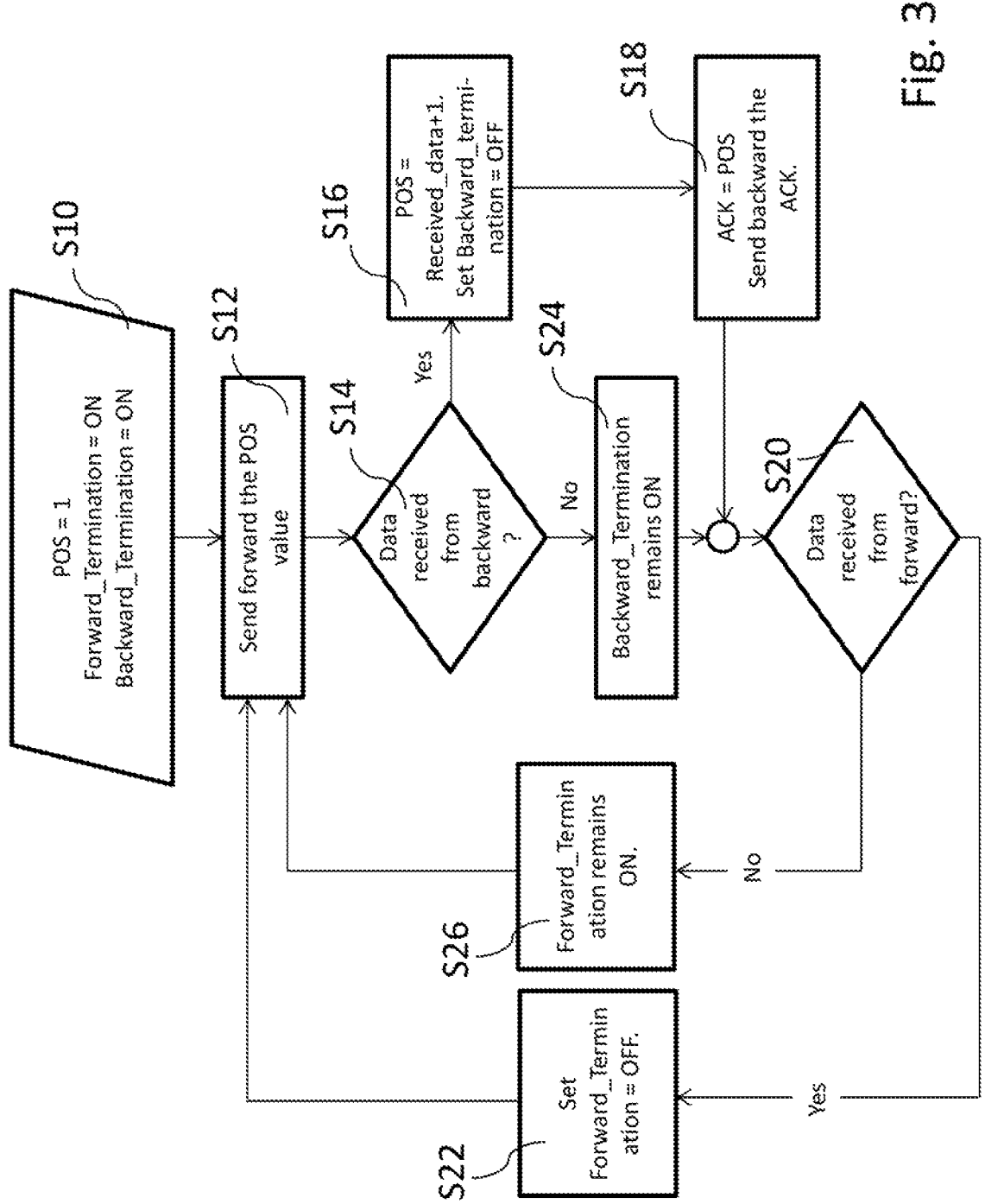
FIG. 3 shows a flow diagram of a method as performed by any one of the individual communication units in the daisy chain bus arrangement of FIG. 2.

This is explained in more detail with respect to a switch in the subunit for coupling a terminal impedance or not to a ground line GND. Reference is here then made to FIG. 3.

FIG. 3 shows a flow diagram of the method performed by an exemplary communication unit, in its interior, namely by the processing unit µP. In step S10, it is assumed that the terminal impedances are switched ON. There are two switches, one for the termination to the forward side (as would be needed for the first communication unit C11), and one for the termination to the backward side (as would be needed for the communication unit C14). Since the communication unit performing the method does not know about its position, it starts to assume that the position is one, and backward_termination is ON. forward_termination is ON as well, since the communication unit might be the only one in a "daisy chain". In step S12, each communication unit sends forward (i.e. via its respective transmitting interface TI-R) the value of the parameter POS, i.e. the preliminary position value.

In step S14, it is determined whether data have been received from backward. Here, it is assumed that a backward communication unit (i.e. one preceding in the daisy chain) has as well sent forward its position value. That might be especially the case if the step S12 is performed by all communication units in a synchronized manner. If in step S14, data are received from backward, then, the position value of the communication unit is increased by one in step S16, and the backward termination is turned OFF. Namely, since the communication unit has received data from backward, no backward termination is needed. In step S18, then, the data value received from backward is sent back, in order to acknowledge receipt.

In step S20, then, the communication unit determines whether data are received from forward, i.e. from a unit following in the daisy chain. If data are received from a following communication unit, in step S22, the forward_termination is turned OFF. Namely, since data are received from, the following communication unit, there does not need to be any termination with respect to it. Then after said S22, again step S12 is performed, namely in synchronization.

If, in step S14, data is not received from backward, then, according to step S24, the backward termination remains ON. That is the case with communication unit C11.

If, in step S26, data is not received from forward, the forward_termination remains ON, in step S26. That is the case with communication unit C14.

FIG. 4 depicts a signal scheme which each of the communication units performs a method according to FIG. 3, with the step S12 and, if any, with step S18, each in synchronization.

In FIG. 4, the individual units are depicted horizontally whilst at the vertical axis from top to down, the time is running. At a first point in time t1, each communication unit C11, C12, C13 and C14 starts in step S10, and respectably sends a position signal in a manner as if it is assumed that each has the position 1, i.e. sends POS=01.

This corresponds to step S12 at point in time t1. Since the received data value is sent back according to step S18, an acknowledge signal ACK is sent from communication unit C12 to communication unit C11 and is received at point in time t2. Communication unit C11 then, at point in time t2, has not received data from backward and does not increase its position number, but has received data from forward and will let the forward_termination ON. In the following, thus, communication unit C11 always sends the position signal POS=01. On the other hand, communication unit C12 has received, at point in time t1, the position signal POS=01 from backward, and has, according to step S16, increased the position number by 1. So have the communication units C13 and C14.

Since communication unit C12 has received the position signal 01 and once again increases it in step S16 by one, again, communication unit C12 sends the position signal POS02. However, communication unit C13 has as well received the position signal POS01 and sends the position signal 02 at point in time T2.

In a final point in time t4, at each instance of sending the signal S12, each communication unit C11, C12, C13 sends the correct position signal POS=01 for C11, POS02 for C12, POS=03 for C13 and POS=04 C14. As to communication unit C14, however, it has not received data from forward in step S24 and has consequently turned or left the forward_termination ON.

At the end of the procedure, thus, the first communication unit C11 knows that it has position POS=01 and has turned or leaves the forward_termination OFF, in step S22, but has left the backward_termination ON, in step S24. The communication unit C12 and C13 have both gone through steps S16 and S22, and thus forward_termination and backward_termination are both OFF. The last communication unit C14 in the daisy chain has gone through step S16 and S26, but not through step S24 and has thus the backward_termination OFF and the forward_termination remained ON.

At the end of the procedure, thus, the switches in the subunit SU are correctly set.

Embodiments of the present method can be configured to allow each communication unit to identify its position and to put the subunit SU into a respective state.

Such state might alternatively or as well include the defining role of the communication unit in the daisy chain. For instance, the first communication unit C11 can take the role of a master, and the following, with the others will be acting as the slaves in the following.

The roles of the preceding unit at the backward side and the following unit at the forward side can, of course, be interchanged since only the first one relates to a first direction and the latter one to a second direction going opposite to the first direction. Furthermore, the method of FIG. 4 could be defined in another way, wherein initially, the terminal impedances are switched off and subsequently some of them are turned on. Then, of course, the roles of which states are changed and which are not changed and remain as they are initially defined, are interchangeable.

If, in the present application, a subunit is defined to be put into a state, that includes maintaining the status, following a predetermined determination. In other words, the state might be initially put and then confirmed, that being the overall putting into that state. The state might also be initially put but then changed, and this is putting into the other state.

While certain exemplary embodiments of a bus system and communication units and methods of making and using the same have been shown and described above, it is to be distinctly understood that the invention is not limited thereto but may be otherwise variously embodied and practiced within the scope of the following claims.

The invention claimed is:

1. A method of operating a first unit in a daisy chain of units allowing bidirectional communication in a bus system, each unit configured to transmit and to receive signals, wherein a plurality of units including said first unit of the daisy chain of units, a second unit of said daisy chain of units and a third unit of said daisy chain of units, the second unit preceding the first unit in the daisy chain of units and the third unit following the first unit in the daisy chain of units, the method comprising:

the first unit transmitting a respective signal via an interface for coupling to the second unit and the first unit also transmitting a respective signal via an interface for coupling to the third unit;

the first unit determining whether or not it receives a signal from both the second unit and the third unit and, upon a determination that the signal was received from both the second unit and the third unit, the first unit operating so as to put at least one subunit into a first state and upon a determination that the signal was not received from both the second unit and the third unit the first unit operating so as to put the at least one subunit into a second state different from said first state.

2. The method of claim 1, wherein the respective signal transmitted to the first unit is a request signal and the respective signal sent to the third unit is a receipt signal sent only if a request signal from another unit of the daisy chain of units is received.

3. The method of claim 2, comprising:

setting a counter by a processing means of each of the units and subsequently increasing or decreasing a starting value of the counter in a predetermined manner dependent on whether or not data are received from a preceding unit and/or from a following unit in the daisy chain.

4. The method of claim 1, comprising:

setting a counter by a processing means of each of the units and subsequently increasing or decreasing a starting value of the counter in a predetermined manner dependent on whether or not data are received from a preceding unit and/or from a following unit in the daisy chain.

5. A communication unit comprising:

a first transmitting interface and a first receiving interface for connecting said communication unit with a first other communication unit;

a second transmitting interface and a second receiving interface for connecting said communication unit with a second other communication unit;

at least one subunit comprising a first subunit to which at least two states are defined;

a processing means for transmitting signals via both the first transmitting interface and the second transmitting interface and for receiving signals via both the first receiving interface and the second receiving interface, and the processing means also for defining a state of the first subunit dependent on whether a signal is received via said first receiving interface and whether a signal is received via said second receiving interface; and the communication unit configured so that upon a determination that a signal was received from both the first other communication unit and the second other communication unit, the processing means of the communication unit operates so as to put the first subunit into a first state and upon a determination that the signal was not received from both the first other communication unit and the second other communication unit the processing means operates so as to put the first subunit into a second state different from said first state.

6. The communication unit of claim 5, wherein said first subunit includes a switch for switchably connecting a terminal impedance to a daisy chain, the daisy chain including the communication unit, the first other communication unit, and the second other communication unit.

7. The communication unit of claim 5, wherein said first subunit acts to define the communication unit as a master in a daisy chain in the first state and as a slave in the daisy chain when in the second state, the daisy chain including the communication unit, the first other communication unit, and the second other communication unit.

8. The communication unit of claim 7, wherein said processing means is configured to cause transmission of a signal via the second transmission interface in response to a signal being received is the first receiving interface.

9. The communication unit of claim 8, wherein said processing means is configured to cause transmission of a signal via the first transmission interface in response to a signal being received via the first receiving interface.

10. The communication unit of claim 8, wherein the processing means comprises a processor connected to a non-transitory computer readable medium.

11. A system including a plurality of communication units, each of the communication units being a communication unit of claim 5, the communication units being arranged in a daisy chain arrangement obtained by coupling the first transmitting interface of a first communication unit to the first receiving interface of a second communication unit and coupling the second receiving interface of the first communication unit to the second transmitting interface of a third communication unit.

12. The system of claim 11, including an RS-485 multi-drop-bus as a communication bus.

13. The method of claim 1, wherein the first unit, the second unit, and the third unit are an entirety of the daisy chain of units.

14. The method of claim 1, wherein the first unit, the second unit, and the third unit are coupled to a communication bus.

15. The method of claim 14, wherein the communication bus is an RS-485 multi-drop-bus.

16. The method of claim 1, wherein the first unit, the second unit, and the third unit each includes at least one duplex interface.

17. The method of claim 1, wherein the at least one subunit includes a switch.

18. The method of claim 17, wherein the switch is connectable to a ground line.

19. The method of claim 17, wherein the first state is a first position for the switch and the second state is a second position for the switch that differs from the first position for the switch.

* * * * *